T. M. CLAGUE.
PROCESS FOR EXTRACTING METALS FROM LIVING BODIES.
APPLICATION FILED SEPT. 20, 1913.
1,123,683.  Patented Jan. 5, 1915.
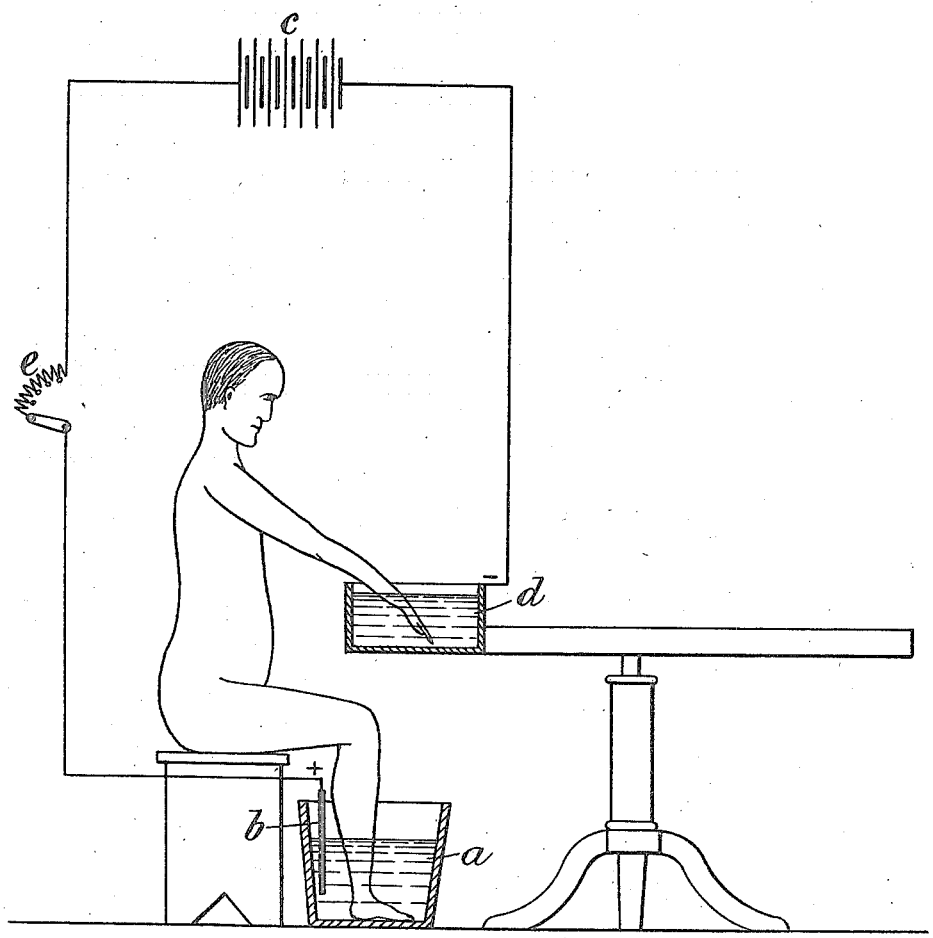

UNITED STATES PATENT OFFICE.

THOMAS MALTBY CLAGUE, OF NEWCASTLE-UPON-TYNE, ENGLAND.

PROCESS FOR EXTRACTING METALS FROM LIVING BODIES.

1,123,683.  Specification of Letters Patent.  Patented Jan. 5, 1915.

Application filed September 20, 1913. Serial No. 790,884.

*To all whom it may concern:*

Be it known that I, THOMAS MALTBY CLAGUE, a subject of the King of Great Britain, residing at 11 Grey street, Newcastle-upon-Tyne, England, have invented a Process for Extracting Metals from Living Bodies, of which the following is a specification.

This invention relates to a process for extracting metals from living bodies with the object of curing and preventing metallic poisoning.

According to this invention metals contained in a living body are removed by submitting the body to a process of electrolysis, the two poles of a source of current being connected to liquids such as water or solutions of a suitable salt with which liquids two separate parts of the body are placed in contact. Preferably the part nearest to the part affected or likely to be affected by the metal is in contact with the liquid connected with the negative pole. For example in the case of lead poisoning the feet are placed in a bath containing water, a small quantity of common salt being preferably added and a metal plate or other electrode connected with the positive pole is put into the bath, while the hands and forearms are placed in another bath connected with the negative pole. A uni-directional and continuous current is passed through the patient, the lead being deposited in the negative bath. The electromotive force may conveniently be about 20 volts.

It is found that the metals which cause poisoning, such as antimony, arsenic, copper, lead, mercury and silver, are those most easily removed from the body by this process.

In the diagrammatic drawing illustrating the invention, $a$ is an insulated vessel containing a solution of common salt for example.

$b$ is a metal plate connected with the positive pole of a battery or other source of electricity $c$.

$d$ is a conducting vessel connected to the negative pole and containing water for example.

$e$ is a rheostat.

On passing the current through the patient's body the metal acting as the poison will be deposited in the vessel $d$.

What I claim is:—

1. A process for extracting a metal from a human body which consists in immersing a part of the body in a conducting liquid, connecting said liquid to the positive pole of a source of electric current, immersing another part of the body in a separate conducting liquid, connecting this liquid to the negative pole of said source and passing a current through the body.

2. A process for extracting a metal from a human body which consists in connecting a part of the body remote from that part from which the metal is to be extracted to the positive pole of a source of electric current, immersing a part near to the part containing the metal in a conducting liquid, connecting the liquid to the negative pole of said source, and passing a current through the body.

3. A process for extracting a metal from a human body which consists in surrounding a part of the body remote from that part from which the metal is to be extracted with a conducting liquid, connecting said liquid to the positive pole of a source of electric current, surrounding a part near to the part from which the metal is to be extracted with a separate conducting liquid, connecting this liquid to the negative pole of said source, and passing a current through the body.

THOMAS MALTBY CLAGUE.

Witnesses:
 A. MITCHINSON,
 T. S. HERD.